United States Patent
Luo et al.

(10) Patent No.: US 10,661,806 B2
(45) Date of Patent: May 26, 2020

(54) METHOD AND DEVICE FOR OPERATING A DRIVE DEVICE, DRIVE DEVICE

(71) Applicant: Robert Bosch GmbH, Stuttgart (DE)

(72) Inventors: Benjin Luo, Stuttgart (DE); Michael Lehner, Pforzheim (DE); Rainer Gasper, Korntal-Muenchingen (DE); Thomas Huber, Daisbach (DE)

(73) Assignee: Robert Bosch GmbH, Stuttgart (DE)

( * ) Notice: Subject to any disclaimer, the term of this patent is extended or adjusted under 35 U.S.C. 154(b) by 120 days.

(21) Appl. No.: 15/766,460

(22) PCT Filed: Sep. 1, 2016

(86) PCT No.: PCT/EP2016/070593
§ 371 (c)(1),
(2) Date: Apr. 6, 2018

(87) PCT Pub. No.: WO2017/060010
PCT Pub. Date: Apr. 13, 2017

(65) Prior Publication Data
US 2019/0084575 A1 Mar. 21, 2019

(30) Foreign Application Priority Data
Oct. 7, 2015 (DE) .......................... 10 2015 219 340

(51) Int. Cl.
*B60W 30/19* (2012.01)
*B60W 10/113* (2012.01)
(Continued)

(52) U.S. Cl.
CPC ............. *B60W 30/19* (2013.01); *B60K 6/387* (2013.01); *B60K 6/48* (2013.01); *B60K 6/547* (2013.01);
(Continued)

(58) Field of Classification Search
CPC .... B60W 30/19; B60W 10/113; B60W 10/02; B60W 10/06; B60W 10/08; B60W 20/10;
(Continued)

(56) References Cited

U.S. PATENT DOCUMENTS 8,771,143 B2 * 7/2014 Tanba ...................... B60K 6/36
477/84
8,808,137 B2 * 8/2014 Kaltenbach .............. B60K 6/48
477/5
(Continued)

FOREIGN PATENT DOCUMENTS

| DE | 102006036758 | 2/2008 |
|----|----|----|
| EP | 1610038 | 12/2005 |
| EP | 2481956 | 8/2012 |

OTHER PUBLICATIONS

ZF Friedrichshafen AG, Machine translation of the Description of DE 10 2006 036758, Feb. 28, 2008 (Year: 2008).*

(Continued)

*Primary Examiner* — Sherry L Estremsky
(74) *Attorney, Agent, or Firm* — Michael Best & Friedrich LLP (57) ABSTRACT

The invention relates to a method for operating a drive device (1) of a motor vehicle, having an internal combustion engine (2), an electric machine (3), and a dual-clutch transmission (4). The dual-clutch transmission (4) has two clutches (K1, K2), by means of which the transmission can be connected to the internal combustion engine (2). At least the internal combustion engine (2) is actuated in a driving operation in order to generate a target drive torque, and the clutches (K1, K2) are actuated in opposite directions for a gear shift. During a gear shift, the electric machine (3) which is connected to the dual-clutch transmission (4) without a (Continued)

clutch is actuated such that the electric machine completely or partly generates the target torque at least temporarily.

19 Claims, 4 Drawing Sheets

(51) Int. Cl.
| | |
|---|---|
| *B60W 20/10* | (2016.01) |
| *B60K 6/387* | (2007.10) |
| *B60K 6/48* | (2007.10) |
| *B60K 6/547* | (2007.10) |
| *B60W 10/02* | (2006.01) |
| *B60W 10/06* | (2006.01) |
| *B60W 10/08* | (2006.01) |
| *F16H 61/688* | (2006.01) |
| *B60W 20/40* | (2016.01) |
| *B60W 20/30* | (2016.01) |
| *F16H 61/04* | (2006.01) |
| *B60W 30/186* | (2012.01) |

(52) U.S. Cl.
CPC ............ *B60W 10/02* (2013.01); *B60W 10/06* (2013.01); *B60W 10/08* (2013.01); *B60W 10/113* (2013.01); *B60W 20/10* (2013.01); *B60W 20/30* (2013.01); *B60W 20/40* (2013.01); *F16H 61/688* (2013.01); *B60K 2006/4825* (2013.01); *B60W 30/186* (2013.01); *B60W 2710/0666* (2013.01); *B60W 2710/083* (2013.01); *F16H 2061/0422* (2013.01); *F16H 2061/0433* (2013.01); *Y02T 10/6221* (2013.01); *Y02T 10/6252* (2013.01)

(58) Field of Classification Search
CPC ........... F16H 61/688; F16H 2061/0422; F16H 2061/0433
See application file for complete search history.

(56) References Cited

U.S. PATENT DOCUMENTS

| | | | | |
|---|---|---|---|---|
| 10,106,147 | B2* | 10/2018 | Park ..................... | B60W 20/15 |
| 2015/0006001 | A1* | 1/2015 | Kawata ................... | B60K 6/48 |
| | | | | 701/22 |
| 2015/0149016 | A1* | 5/2015 | Saitoh ................... | B60K 6/485 |
| | | | | 701/22 |
| 2018/0229712 | A1* | 8/2018 | Shelton ................ | B60W 10/02 |
| 2018/0257633 | A1* | 9/2018 | Meyer .................. | B60W 20/13 |
| 2019/0001962 | A1* | 1/2019 | Park ...................... | B60W 20/30 |

OTHER PUBLICATIONS

International Search Report for Application No. PCT/EP2016/070593 dated Nov. 3, 2016 (English Translation, 3 pages).

\* cited by examiner

METHOD AND DEVICE FOR OPERATING A DRIVE DEVICE, DRIVE DEVICE

BACKGROUND OF THE INVENTION

The invention relates to a method for operating a drive device of a motor vehicle, which drive device has an internal combustion engine, an electric machine and a dual-clutch transmission, wherein the dual-clutch transmission has two clutches by which it can be connected to the internal combustion engine, wherein in a driving mode at least the internal combustion engine is actuated in order to generate a target drive torque, and is connected to the dual-clutch transmission by one of the clutches, and wherein the clutches are activated in opposite directions for a gear shifting process.

In addition, the invention relates to a device for operating the drive device described above as well as to a corresponding drive device.

Methods, devices and drive devices of the type mentioned at the beginning are basically known from the prior art. In particular, what are referred to as hybrid drive devices which, in addition to an internal combustion engine, have at least one electric machine are being used increasingly in motor vehicle construction. Such drive devices permit different types of driving modes to be implemented, such as for example a purely electric mode, a purely internal combustion engine mode and a mixed mode in which the drive torque of the motor vehicle is generated jointly both by the electric motor and by the internal combustion engine. Because the electric motor can also be operated as a generator, it is possible here to charge a vehicle battery of the motor vehicle electrically by load point shifts of the internal combustion engine, or to feed electrical energy into the battery during a braking process. The drive machines, electric motor and internal combustion engine are usually not connected directly to driven wheels of the motor vehicle but instead with the intermediate connection of a transmission having a variable transmission ratio. In the simplest case, this transmission is an automated transmission with a plurality of permanently predefined transmission ratios. In order to reduce shift times, it is also known to provide dual-clutch transmissions which have two transmission shafts which run one inside the other and are each connected to a clutch by which the respective transmission shaft can be operatively connected to the internal combustion engine, such that a torque which is provided by the internal combustion engine can be transmitted to the respective transmission shaft. By advantageous actuation of the clutches in opposite directions it is possible here for a gear on one of the transmission shafts to be changed while a drive torque is transmitted from the internal combustion engine to the driven wheels by the other transmission shaft. By simultaneously engaging the one clutch and disengaging the other clutch it is therefore possible for a gear shifting process to take place virtually without a shifting delay, which would give rise to an interruption in the tractive force. The electric machine can be arranged at different locations of such a drive device in order to generate an additional positive or negative machine torque which is transmitted to the driven wheels.

SUMMARY OF THE INVENTION

The method according to the invention has the advantage that the shifting delay or a delay or interruption in the tractive force which can be felt by the driver or the occupants of the motor vehicle is reduced further compared to known solutions and is under certain circumstances completely suppressed. As a result, on the one hand, the driving comfort is increased and, on the other hand, advantages with respect to the driving safety are achieved or ensured on the basis of a uniform buildup of torque at the driven wheels.

According to the invention there is provision for this purpose that during a gear shifting process the electric machine which is connected to the dual-clutch transmission without a clutch is actuated in such a way that said electric machine at least temporarily completely or partly generates the target torque. The invention therefore provides that during a gear shifting process the engine torque of the internal combustion engine which falls away at the driven wheels as a result of the opening of the clutch is completely or partially compensated by a machine torque of the electric machine, in particular when in the driving mode only the internal combustion engine is actuated in order to generate the target drive torque. Therefore, in particular in the case of shifting up of the dual-clutch transmission, that is to say from a relatively low gear to a relatively high gear, or from a gear with a relatively high transmission ratio to a gear with a relatively low transmission ratio, an interruption in the tractive force is reliably avoided. As a result of the fact that the electric machine is connected to the dual-clutch transmission permanently or without a clutch there is also no additional shifting process necessary in order to connect the electric machine to the dual-clutch transmission or to the drive train, with the result that the interruption in the tractive force is advantageously reduced or minimized solely by the actuation of the electric machine which reacts very dynamically to an actuation process. The provision of the target torque is preferably completely assumed by the electric machine in order to completely avoid the interruption in the tractive force. However, this depends on the dimensioning of the electric machine which, under certain circumstances, can only partially provide the requested target torque. In this case, it is expedient for the target torque to be generated at least as far as possible by the electric machine, in order to reduce the interruption in the tractive force as far as possible.

According to one preferred development of the invention there is provision that when the internal combustion engine and the electric machine are actuated in the driving mode in order to generate the target torque jointly, during the gear shifting process the electric machine is actuated in such a way that said electric machine completely or partially takes over that portion of the target drive torque which is provided by the internal combustion engine. Therefore, if the target torque is generated by both drive machines, during the gear shifting process the electric machine additionally still takes over the portion of the target torque which was generated by the internal combustion engine, at least in so far as is possible by the existing electric machine and, if appropriate, given a current state of charge of the energy store or of the vehicle battery.

According to one preferred development of the invention there is provision that in order to initiate the gear shifting process the torque which is transmitted by the internal combustion engine to the dual-clutch transmission is reduced. The gear shifting process is therefore initiated by virtue of the fact that the torque which is made available by the internal combustion engine is reduced. This reduction is expediently completely or partially compensated by the electric machine, as already described above. In particular, the compensation takes place in such a way that the engine torque of the internal combustion engine is continuously reduced and the machine torque of the electric machine continuously increased, in order to bring about the changeover between the generator of the drive torque without an interruption in the tractive force at the driven wheels.

There is preferably provision that the torque is reduced by opening the clutch which currently connects the internal combustion engine to the dual-clutch transmission. In particular slow opening of the clutch ensures that the engine torque which is currently made available by the internal combustion engine is not completely transmitted to the dual-clutch transmission. Through slipping operation of the clutch, the internal combustion engine torque is reduced by reducing in a simple way the torque which the clutch transmits from the internal combustion engine to the transmission. The other clutch is preferably closed simultaneously or at a later time after, for example, a gear shifting process has taken place.

Alternatively or additionally there is preferably provision that the torque which is transmitted from the internal combustion engine to the dual-clutch transmission is provided by reducing the engine torque of the internal combustion engine. The engine torque or a target internal combustion engine torque corresponds to the target drive torque in the case in which the drive torque is made available solely by the internal combustion engine in the initial state. If the drive torque is generated by the internal combustion engine and the electric machine together, the target engine torque corresponds to the portion of the drive target torque which is made up by the internal combustion engine torque. In particular, the engine torque of the internal combustion engine is decreased or reduced even before the clutch which connects the internal combustion engine currently to the dual-clutch transmission is opened. As a result, the engine torque which falls away is compensated by the electric machine even before the internal combustion engine is disconnected from the dual-clutch transmission in order to carry out the shifting process.

Expediently, when the torque which is to be transmitted is reduced, a machine torque of the electric machine is simultaneously increased. The machine torque is expediently increased to the same degree as the torque which is transmitted by the internal combustion engine is reduced.

Furthermore, there is preferably provision that the clutch which connects the internal combustion engine to the dual-clutch transmission is not opened until the torque of the internal combustion engine is reduced of zero. As a result, the clutch which connects the internal combustion engine to the dual-clutch transmission is then load-free and can be opened gently with minimal wear.

Furthermore, there is preferably provision that during a rotational speed synchronization of the dual-clutch transmission during the gear shifting process both clutches are opened completely. As a result, a low-wear gear shifting process of the dual-clutch transmission is ensured. Although both clutches are opened, the embodiment according to the invention ensures that an interruption in the tractive force is prevented or that the target drive torque is at least substantially made available by the electric machine.

According to one preferred development of the invention there is provision that in order to initiate the gear shifting process the clutch which connects the internal combustion engine to the dual-clutch transmission is opened and at the same time the other clutch is at least partially closed. As a result, a particularly rapid gear shifting process can take place. The compensating electric machine ensures that an interruption in the tractive force also at least substantially fails to occur here.

The device according to the invention is defined by a specially designed control unit which carries out the method according to the invention in the case of intended use. As a result, the advantages already mentioned are obtained. Further advantages and preferred features arise, in particular, from what has been described above and from the claims.

The drive device according to the invention is defined by the device according to the invention. The advantages mentioned above are obtained as a result.

BRIEF DESCRIPTION OF THE DRAWINGS

In the text which follows, the advantages of the inventions will be explained further on the basis of an exemplary embodiment. In this respect.

DETAILED DESCRIPTION

Figure 1:
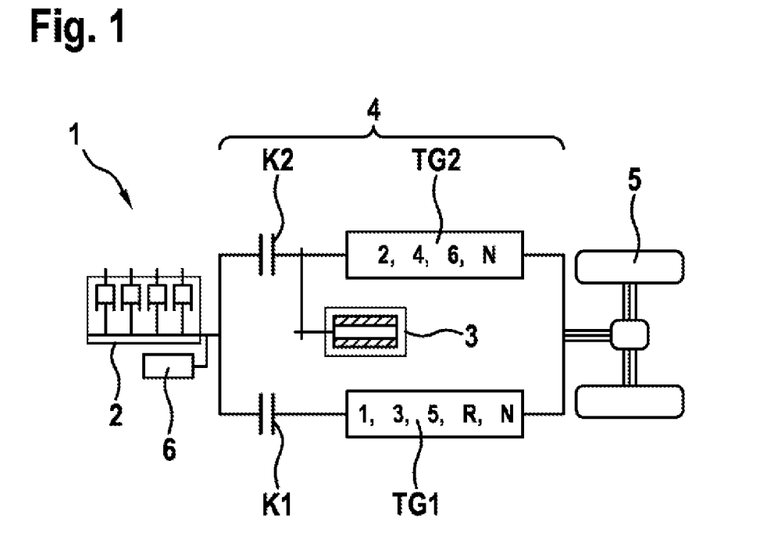
FIG. 1 shows a drive device of a motor vehicle in a functional illustration.

FIG. 1 shows a drive device 1 of a motor vehicle, which drive device 1 is embodied as a hybrid drive device. For this purpose, the drive device 1 has an internal combustion engine 2 and an electric machine 3, which are connected by a dual-clutch transmission 4, which is illustrated only functionally in FIG. 1, to at least one driven wheel 5 of the motor vehicle. The dual-clutch transmission 4 has two clutches K1 and K2 by which it can be operatively connected to the internal combustion engine 2. In this context, the dual-clutch transmission 4 has two partial transmissions TG1 and TG2 which each have different transmission ratios and are operatively connected to the driven wheel 5. Thus, the partial transmission TG1 here has, for example, the transmission ratios for the gears 1, 3, 5, the reverse gear and a neutral gear N, while the partial transmission TG2 has the transmission ratios for the gears 2, 4 and 6 and a neutral gear N. In particular, the dual-clutch transmission 4 is embodied in such a way that, as shown here, the next highest or the next lowest transmission ratio is located in each case on the other partial transmission. An input shaft of the partial transmission TG1 is connected here to the clutch K1, and an input shaft of the partial transmission TG2 is connected to the clutch K2, with the result that the internal combustion engine 2 is operatively connected either to the partial transmission TG1 or to the partial transmission TG2 as a function of which of the two clutches K1 and K2 is closed. If both clutches K1 and K2 are opened, the internal combustion engine 2 is completely disconnected from the dual-clutch transmission 4 and cannot transmit either a positive or a negative torque to the driven wheel 5. The electric machine 3 is connected to the input shaft of the partial transmission TG2 permanently or without a clutch. The electric machine 3 is coupled to the input shaft here, for example, by a belt drive or by a gear mechanism. Alternatively, the electric machine 3 can, however, also be connected to the partial transmission TG2 at the output shaft or at another location in the partial transmission TG2. Furthermore, a starter motor 6 is assigned to the internal combustion engine 2 here.

In the case of a gear shifting process from a relatively low to a relatively high gear, for example from the gear 3 to the gear 4, the procedure adopted is usually as follows: in the initial state in the partial transmission TG2 the gear 4 is already engaged. In the partial transmission TG1 the gear 3 is engaged, the clutch K2 is opened and the clutch K1 is closed, and the internal combustion engine 2 makes available a positive engine torque which is transmitted to the driven wheel 5 according to the transmission ratio of the gear 3. In this context, the torque or the power flows from the internal combustion engine 2 through the clutch K1, the partial transmission TG1 to the driven wheel 5. In the final state, the flow of torque is to be transmitted from the internal combustion engine 2 through the clutch K2 and the partial transmission TG2 to the driven wheel 5 with the transmission ratio of the gear 4. In order to pass from the initial state to the final state, the following steps are carried out:

For the sake of simplification, a constant driver's request torque and a constant velocity are assumed, with the result that the rotational speeds of the partial transmissions TG1 and TG2 as well as the required torques in the respective gears do not change. In the case of shifting up from the third into the fourth gear, a differentiation is made between a torque transfer from the partial transmission TG1 to the partial transmission TG2 and subsequent synchronization of the rotational speed of the internal combustion engine to the rotational speed of the partial transmission TG2. Since the torque request by the driver at the driven wheel 5 of the entire shifting operation is to remain constant, the torque of the internal combustion engine 2 has to be raised during the torque transfer. The required raising of the torque can be calculated from the transmission ratio of the fourth gear in the partial transmission TG2 and the desired driver's request torque. During the synchronization of the rotational speed of the internal combustion engine 2 with the partial transmission TG2, the torque of the internal combustion engine 2 is lowered so far that the rotational speed of the internal combustion engine 2 is lowered to the input rotational speed of the partial transmission TG2. The clutch torque of the partial transmission TG1 or the torque which is transmitted by the clutch K1 is lowered during the torque transfer to zero and the clutch torque of the partial transmission TG2 or of the clutch K2 is raised from zero to the required drive torque. In this context it is advantageously necessary to ensure that the sum of the two clutch torques during the torque transfer is equal to the desired driver's torque so that an interruption in the tractive force and therefore a reduction in the comfort do not occur. Furthermore, the clutch torque of the partial transmission TG2 has to be kept constant during the synchronization of the rotational speed in order to prevent the tractive force from being interrupted. During the transfer of torque, the rotational speed of the internal combustion engine has to be kept constant, or must be slightly increased so that the slip of the clutch K1 is always positive. This is important so that the sign of the transmitted torque of a slipping clutch depends on the sign of the difference in rotational speed. There is therefore expediently provision that the rotational speed of the internal combustion engine 2 is higher than or equal to the input rotational speed of the partial transmission TG1, in order to transmit a positive torque. If the rotational speed of the internal combustion engine 2 drops below the input rotational speed of the partial transmission TG1, the sign of the transmitted torque changes and a significantly perceptible dip occurs in the drive torque at the driven wheel 5, which in turn leads to an interruption in the tractive force which can be clearly felt by the driver and other occupants of the motor vehicle. In this context, the rotational speed cannot be synchronized until the entire engine torque of the internal combustion engine 2 has been transferred to the clutch K2 of the partial transmission TG2. For the partial transmission TG2, in the case of a tractive upshift, that is to say a gear shifting process to a relatively high gear, the rotational speed of the internal combustion engine is always higher than the rotational speed of the input shaft of the partial transmission TG2, in order to ensure a positive transmission of torque. During the synchronization of the rotational speed, the rotational speed of the internal combustion engine 2 must be lowered to the input rotational speed of the partial transmission TG2, in order to be able to close the clutch K2 completely.

The required driver's request torque at the driven wheel 5 can be distributed between the electric machine 3 and the internal combustion engine 2 by the electric machine 3, in order to be able to operate the internal combustion engine 2, for example, at an operating point which is optimum in terms of consumption. The target drive torque which is to be made available overall at the driven wheel 5 by the drive device 1 can therefore be provided jointly by the internal combustion engine 2 and the electric machine 3. Depending on the operating strategy, the portions of the target drive torque provided by the internal combustion engine 2 and electric machine 3 change here.

In order to increase further the comfort for a driver and further occupants of the motor vehicle during the shifting up, to relieve the loading of the internal combustion engine 2 and the clutches K1 and K2 and therefore to obtain a lower level of wear of the clutches K1 and K2, there is provision here that during the gear shifting process the torque of the internal combustion engine 2 is transferred completely or partially to the electric machine 3 as a function of the efficiency of the electric machine 3. As a result, low torques or no torques have to be transmitted between the clutches K1 and K2 of the partial transmissions TG1 and TG2 during the torque transfer. This has the advantage that the comfort is increased and the wear reduced. Furthermore, smaller dimensioning of the drive device, in particular of the clutches K1, K2, is possible, which gives rise to improved installation space conditions and lower manufacturing costs. The advantageous method is to be explained in more detail with reference to FIGS. 2 to 7. In this context, the initial state and final state described above are used as the starting points.

Figure 2:
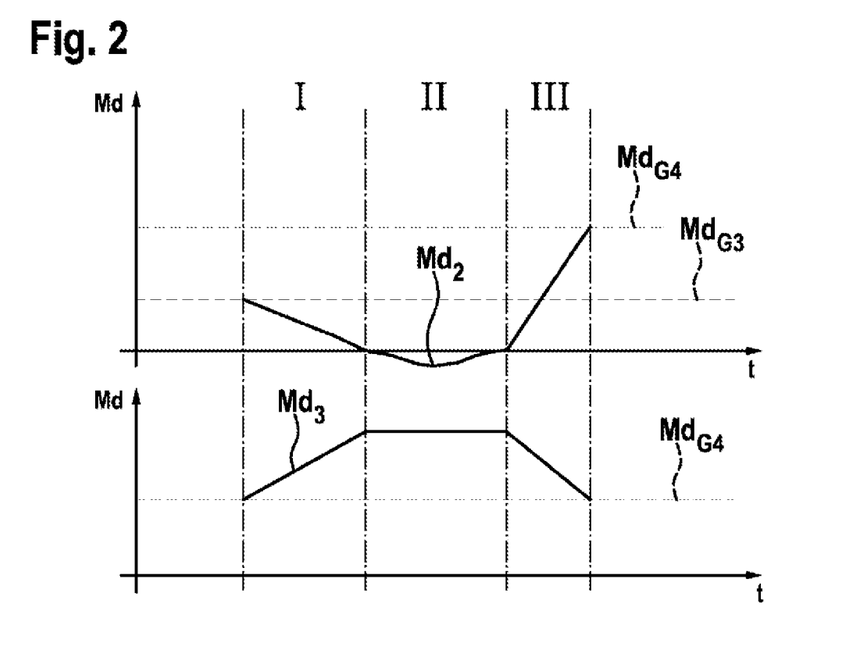
FIG. 2 shows a diagram explaining an advantageous method for operating the drive device.

FIG. 2 shows in a diagram plotted against the time t the machine torque $Md_3$ of the electric machine 3 and the engine torque $Md_2$ of the internal combustion engine 2 during a gear shifting process, wherein it is assumed here that the transmission ratio of the electric machine 3 to the partial transmission TG2 is equal to 1. Furthermore, the torques of the partial transmissions TG1 and TG2 for the third gear $Md_{G3}$ and the fourth gear $Md_{G4}$ are shown. During the shifting up from the third to the fourth gear, that is to say during a changeover from the partial transmission TG1 to the partial transmission TG2, the torque $Md_2$ of the internal combustion engine 2 is firstly transmitted to the electric machine 3 in a phase I, so that the electric machine 3 makes available the entire driver's request torque through the partial transmission TG2 and the driven wheel 5. After this, in phase II the rotational speed synchronization of the internal combustion engine 2 and of the partial transmission TG2 occurs. If the rotational speeds are synchronized, in phase III the clutch K2 of the partial transmission TG2 is completely closed, and the torque is transmitted from the electric machine 3 again to the internal combustion engine 2 or, if the target drive torque is to be provided jointly by the internal combustion engine 2 and the electric machine 3, it is distributed between the internal combustion engine 2 and the electric machine 3.

Figure 3:
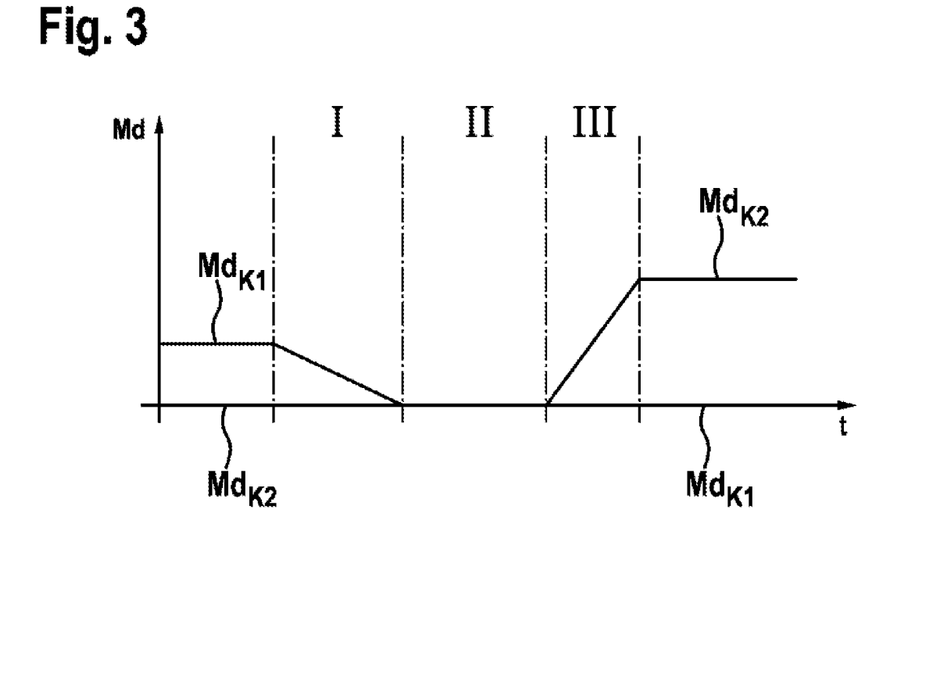
FIG. 3 shows a further diagram explaining the method.

FIG. 3 shows in a further diagram plotted against the time t the torques $Md_{K1}$ and $Md_{K2}$ which are transmitted by the clutches K1 and K2. The torque of the clutch K1 of the partial transmission TG1 is lowered to zero to the same degree as the torque $Md_2$ of the internal combustion engine 2. If the clutch K1 is load-free, it can be opened, or the clutch K2 can already be adjusted beforehand in order to implement a faster shifting process. In contrast to a conventional gear shifting process in which the internal combustion engine torque is transferred to the clutch K2 of the partial transmission TG2 with an associated increase in the torque, the transmitted torque of the clutch K2 of the partial transmission TG2 is here equal to zero in the phases I and II. The clutch K2 is still completely opened and there is no slip and therefore no wear present. During the synchronization of the rotational speed in the phase II, both clutches K1 and K2 are completely opened. The clutch K2 of the partial transmission TG2 is completely closed, in particular, before the torque transfer from the electric machine 3 to the internal combustion engine 2 and is optionally increased with the internal combustion engine torque $Md_2$ in order to permit a faster shifting process.

Figure 4:
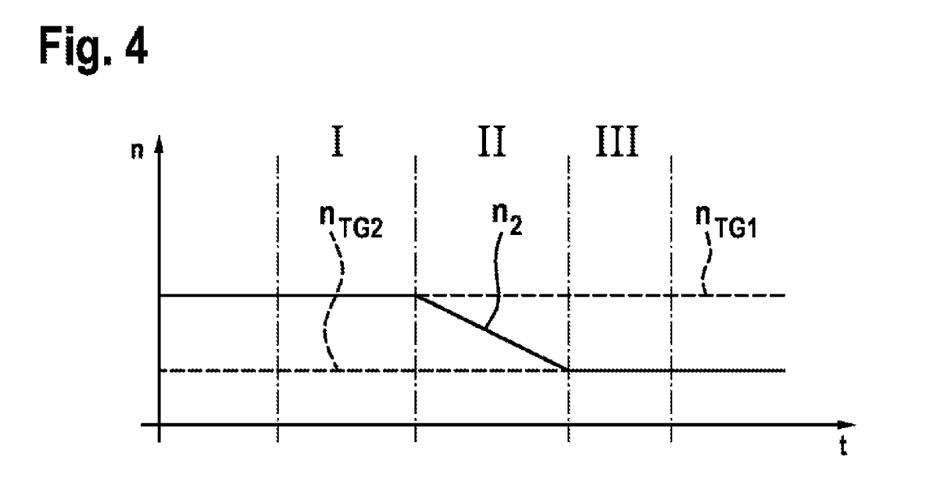
FIG. 4 shows a further diagram explaining the method.
Figure 5:
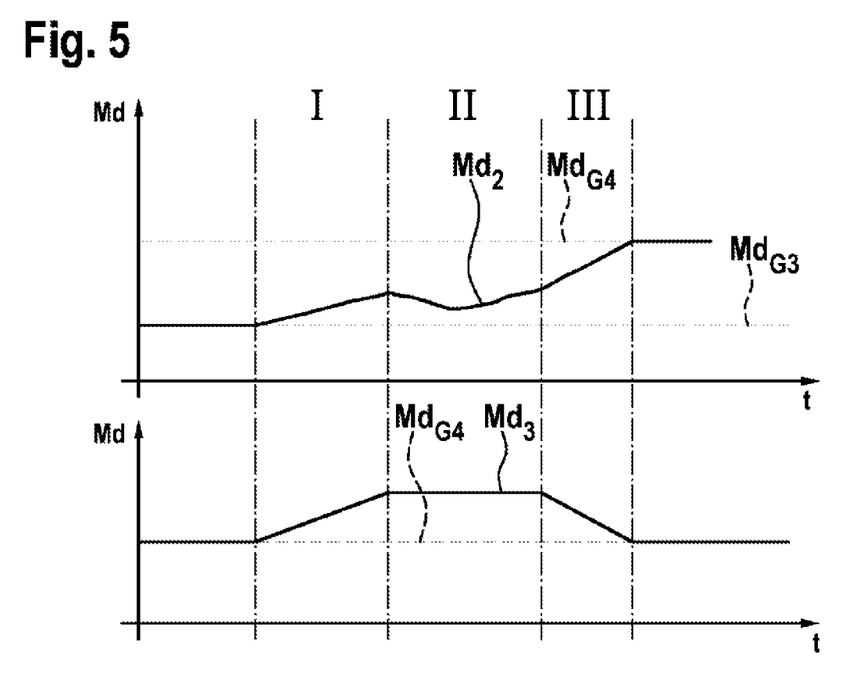
FIG. 5 shows a diagram explaining a variant of the method.

FIG. 4 shows in a further diagram plotted against the time t the rotational speed n2 of the internal combustion engine 2 during the described gear shifting process. Here, the input rotational speeds $n_{TG2}$ and $n_{TG1}$ which remain the same owing to the constant velocity of the motor vehicle are also shown with the respectively engaged gear 3 or 4 by dashed lines. The rotational speed profile of the internal combustion engine 2 corresponds to the rotational speed profile during a conventional shifting process. However, because the clutches K1 and K2 have to operate with very much less slip and as a result the wear and the loading of the clutches K1 and K2 is reduced compared to the conventional gear shifting process, the advantages already specified above are obtained.

In the event of the electric machine 3 not being able to completely provide the entire target drive torque or driver's request torque, a reduction in the necessary clutch torques during the torque transfer from the partial transmission TG1 to the partial transmission TG2 is always possible using the electric machine 3. The sequence of the gear shifting process is explained below with reference to FIG. 5 in a way analogous to the shifting sequences described above.

FIG. 5 shows again the diagram which is also shown in FIG. 2, with the difference that the electric machine 3 is not able to take over completely the torque of the electric motor 2. In the phase I at the same time part of the torque $Md_2$ of the internal combustion engine 2 is transmitted to the electric machine 3, while the remaining part of the torque of the internal combustion engine is also transmitted to the partial transmission TG2. After this, the synchronization of the rotational speed in phase II takes place. If the rotational speeds are synchronized, the clutch K2 of the partial transmission TG2 can be closed completely, and the target drive torque can be distributed again between the electric machine 3 and the internal combustion engine 2 to phase III.

Figure 6:
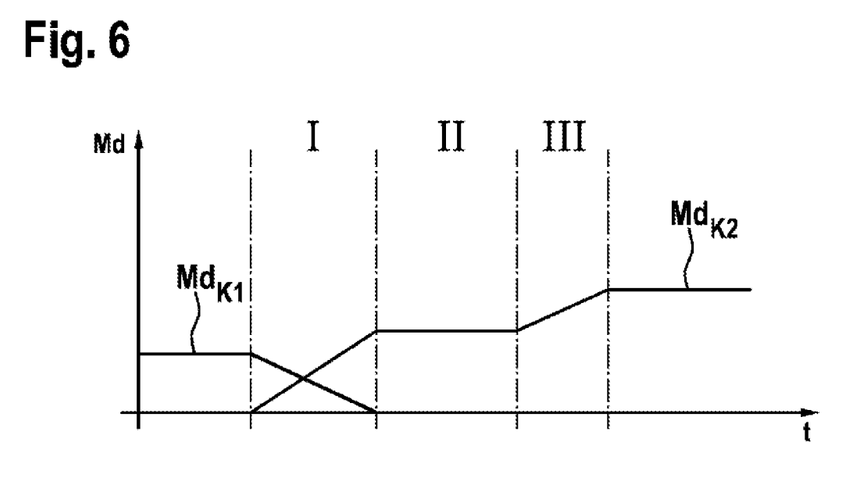
FIG. 6 shows a further diagram explaining the further variant of the method.

The associated torques which are transmitted by the clutches K1 and K2 are shown in FIG. 6. The transmitted torque of the clutch K1 is initially lowered to zero in the phase I. As soon as the clutch K1 is load-free, it can be opened, or the clutch can already be adjusted beforehand in order to implement a faster shifting process. At the same time, the internal combustion engine torque $Md_2$ is taken over by the clutch K2. In contrast to a conventional gear shifting process in which the internal combustion engine torque $Md_2$ is transferred to the clutch K2 (with the associated increase in the torque), the torque $Md_{K2}$ of the clutch K2 is lower here. In the slip, a relatively low power loss, which is proportional to the transmitted torque $Md_{K2}$, is input into the clutch K2 and therefore a lower wear of the clutch K2 with respect to the conventional gear shifting process is achieved. The torque of the clutch K2 is also lower during the synchronization of the internal combustion engine 2. As a result, a lower power loss in the clutch K2 is achieved over the entire shifting process or gear shifting process. This gives rise to a reduced wear of the clutch K2 and therefore to an increased service life.

Figure 7:
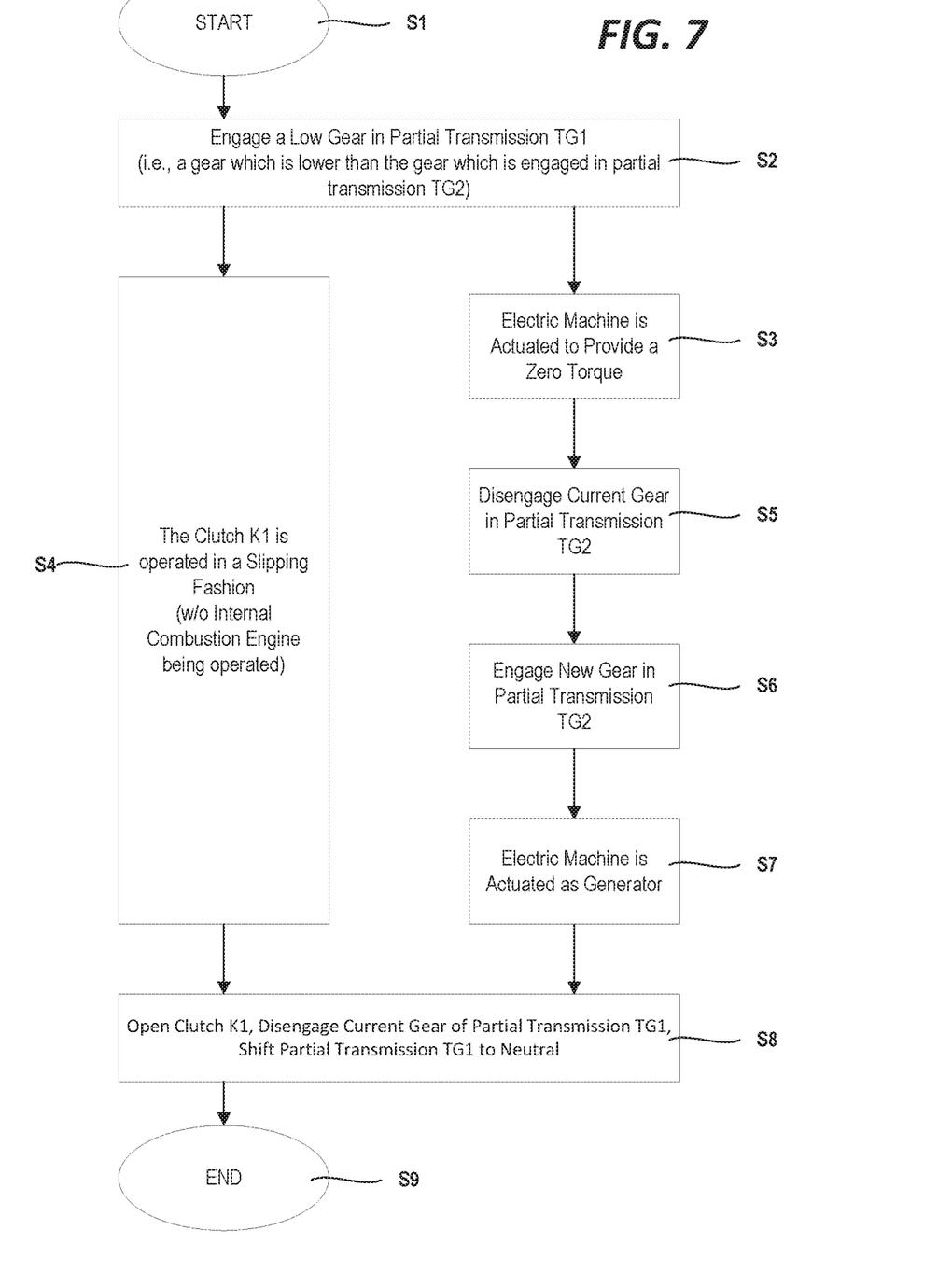
FIG. 7 shows a flowchart explaining a further advantageous method for operating the drive device.

FIG. 7 shows in a flowchart an advantageous method for operating the drive device during shifting down, that is to say during a gear shifting process from a relatively high gear to a relatively low gear, by which process shifting of the gear of the partial transmission TG2 without an interruption in the tractive force is made possible during a recuperation mode of the electric machine 3. In this context, the following initial state is taken as the starting point: in the partial transmission TG2 a gear, for example gear 4, is engaged, the clutch K2 is opened, and the internal combustion engine 2 is switched off, the clutch K1 is opened and the electric machine 3 is operated as a generator. As a final state, a relatively low gear, for example gear 2, is to be engaged in the partial transmission TG2, the clutches K1 and K2 are to be opened and the internal combustion engine is to be switched off and the electric machine 3 is to continue to be operated as a generator, and in this respect a negative torque is to be generated.

In the step S1, the method is started with the abovementioned initial state. In the following step S2 in a partial transmission TG1 a low gear is engaged, in particular a gear which is lower than the gear which is engaged in the partial transmission TG2, in particular the lowest available gear with the highest transmission ratio of the partial transmission TG1, in order to achieve the highest possible rotational speed at the clutch K1.

Subsequently, in a step S3 for the gear shifting process the electric machine 3 is actuated to provide a zero torque, that is to say to run in an idling mode. In this context, the clutch K1 is operated in a slipping fashion in a step S4, without the internal combustion engine 2 being operated. The slipping operation of the clutch K1 generates a decelerating torque in the partial transmission TG1 in that energy is destroyed in the clutch K1 by the slip, and therefore an interruption in the tractive force is compensated by the zero torque of the electric machine 3.

Subsequently, the current gear, for example gear 4, is disengaged in the partial transmission TG2 in a step S5, and a new, relatively low gear, in particular the next lowest gear, here gear 2, is engaged in a subsequent step S6. In parallel with this, the decelerating target drive torque continues to be made available by the slipping operation of the clutch K1.

In a subsequent step S7, the electric machine 3 is again actuated to be operated as a generator, and in this context to make available a decelerating drive torque, which acts on the driven wheel 5 for the partial transmission TG2. While the torque of the electric machine 3 is increased again, the clutch K1 is opened again, in order to reduce the deceleration torque which is generated by the slip. As soon as the clutch K1 is completely opened, the engaged gear of the partial transmission TG1 is preferably disengaged again in a step S8, and the partial transmission TG1 is shifted, in particular, into a neutral gear or state. As a result, the method is ended in a step S9. The shifting process is advantageously carried out as quickly as possible so that as little energy as possible is destroyed in the clutch K1 by the slipping operation, and the wear is kept small. Alternatively, there can be provision that the internal combustion engine 2 also rotates as long as the clutch K1 generates a decelerating torque.

By means of this method, a gear shifting process of the partial transmission TG2 which is free of an interruption in the tractive force is made possible during a recuperation mode, as a result of which the electric machine can be operated in a high gear at high speeds, with better efficiency and a high torque. As a result, purely electric driving is optimized even at relatively high speeds, in particular with respect to the driving comfort. The comfort of the dual-clutch transmission 4, specifically the shifting which is free of an interruption in the tractive force, is therefore ensured even in the purely electric mode of the motor vehicle, with just one electric machine which is assigned to just one of the partial transmissions TG1 or TG2.

The invention claimed is:

1. A method for operating a drive device of a motor vehicle, which drive device has an internal combustion engine, an electric machine and a dual-clutch transmission, wherein the dual-clutch transmission has two clutches by which it can be connected to the internal combustion engine, and the electric machine is connected to the dual-clutch transmission without a clutch, the method comprising:
   actuating, in a driving mode, the internal combustion engine to generate a target drive torque,
   activating the two clutches in opposite directions during a gear shifting process, wherein during the gear shifting process the electric machine is actuated in such a way that the electric machine at least partially generates the target torque,
   wherein to initiate the gear shifting process the torque which is transmitted by the internal combustion engine to the dual-clutch transmission is reduced, and
   wherein the torque is reduced by opening the clutch which currently connects the internal combustion engine to the dual-clutch transmission.

2. The method as claimed in claim 1, wherein the electric machine is actuated in such a way that said electric machine completely or partially takes over that portion of the target drive torque which is provided by the internal combustion engine.

3. The method as claimed in claim 1, wherein the clutch which connects the internal combustion engine to the dual-clutch transmission is not opened until the engine torque of the internal combustion engine is reduced to zero.

4. The method as claimed in claim 1, wherein during a rotational speed synchronization of the dual-clutch transmission during the gear shifting process both clutches are opened completely.

5. The method as claimed in claim 1, wherein in order to initiate the gear shifting process the clutch which connects the internal combustion engine to the dual-clutch transmission is opened and at the same time the other clutch is at least partially closed.

6. A method for operating a drive device of a motor vehicle, which drive device has an internal combustion engine, an electric machine and a dual-clutch transmission, wherein the dual-clutch transmission has two clutches by which it can be connected to the internal combustion engine, and the electric machine is connected to the dual-clutch transmission without a clutch, the method comprising:
   actuating, in a driving mode, the internal combustion engine to generate a target drive torque,
   activating the two clutches in opposite directions during a gear shifting process, wherein during the gear shifting process the electric machine is actuated in such a way that the electric machine at least partly generates the target torque, and
   wherein during a rotational speed synchronization of the dual-clutch transmission during the gear shifting process both clutches are opened completely.

7. The method as claimed in claim 6, wherein to initiate the gear shifting process the torque which is transmitted by the internal combustion engine to the dual-clutch transmission is reduced.

8. The method as claimed in claim 7, wherein the torque is reduced by reducing an engine torque of the internal combustion engine.

9. The method as claimed in claim 7, wherein the torque is reduced by opening the clutch which connects the internal combustion engine to the dual-clutch transmission.

10. The method as claimed in claim 6, wherein the electric machine is actuated in such a way that said electric machine completely or partially takes over that portion of the target drive torque which is provided by the internal combustion engine.

11. The method as claimed in claim 6, wherein the clutch which connects the internal combustion engine to the dual-clutch transmission is not opened until the engine torque of the internal combustion engine is reduced to zero.

12. The method as claimed in claim 6, wherein in order to initiate the gear shifting process the clutch which connects the internal combustion engine to the dual-clutch transmission is opened and at the same time the other clutch is at least partially closed.

13. A method for operating a drive device of a motor vehicle, which drive device has an internal combustion engine, an electric machine and a dual-clutch transmission, wherein the dual-clutch transmission has two clutches by which it can be connected to the internal combustion engine, and the electric machine is connected to the dual-clutch transmission without a clutch, the method comprising:
   actuating, in a driving mode, the internal combustion engine to generate a target drive torque,
   activating the two clutches in opposite directions during a gear shifting process, wherein during the gear shifting process the electric machine is actuated in such a way that the electric machine at least partly generates the target torque, and
   wherein in order to initiate the gear shifting process the clutch which connects the internal combustion engine to the dual-clutch transmission is opened and at the same time the other clutch is at least partially closed.

14. The method as claimed in claim 13, wherein the electric machine is actuated in such a way that said electric machine completely or partially takes over that portion of the target drive torque which is provided by the internal combustion engine.

15. The method as claimed in claim 13, wherein to initiate the gear shifting process the torque which is transmitted by the internal combustion engine to the dual-clutch transmission is reduced.

16. The method as claimed in claim 15, wherein the torque is reduced by opening the clutch which currently connects the internal combustion engine to the dual-clutch transmission.

17. The method as claimed in claim 15, wherein the torque is reduced by reducing an engine torque of the internal combustion engine.

18. The method as claimed in claim 13, wherein the clutch which connects the internal combustion engine to the dual-clutch transmission is not opened until the engine torque of the internal combustion engine is reduced to zero.

19. The method as claimed in claim 13, wherein during a rotational speed synchronization of the dual-clutch transmission during the gear shifting process both clutches are opened completely.

* * * * *